United States Patent [19]

Smith

[11] Patent Number: 4,476,946
[45] Date of Patent: Oct. 16, 1984

[54] WEIGHT MEASURING ARRANGEMENT FOR COOKING APPLIANCE SURFACE UNIT

[75] Inventor: Peter H. Smith, Anchorage, Ky.

[73] Assignee: General Electric Company, Louisville, Ky.

[21] Appl. No.: 438,764

[22] Filed: Nov. 3, 1982

[51] Int. Cl.³ .................. G01G 19/52; G01G 3/11; G01G 3/08; G01G 19/00
[52] U.S. Cl. .................. 177/144; 177/211; 177/229; 177/245; 73/296; 219/518; 219/458; 219/433
[58] Field of Search ............ 177/132, 144, 211, 229, 177/245; 73/296; 374/14; 219/518

[56] References Cited

U.S. PATENT DOCUMENTS 1,769,639  7/1930  Gustafson ..................... 73/296 X
3,199,345  8/1965  Lee et al. ..................... 177/211 X
4,062,416  12/1977  Berg et al. ..................... 177/229 X

FOREIGN PATENT DOCUMENTS

292764  10/1967  United Kingdom ............ 219/518

Primary Examiner—E. A. Goldberg
Assistant Examiner—Patrick W. Foster
Attorney, Agent, or Firm—H. Neil Houser; Radford M. Reams

[57] ABSTRACT

A weight measuring arrangement for a cooking appliance in which a surface heating unit also functions as a scale platform. A three arm cantilever beam supports the heating unit. A set of four strain gages measures the strain of the three support arms, with one gage each being attached to each of two identical support arms and the remaining two gages being attached to the third arm, which arms are constructed such that the strain measured by each of the gages secured to the third arm is one-half that measured by each of the gages secured to the two identical arms when the ends of all three arms are equally deflected by a utensil placed on the surface unit for heating. The gages are electrically connected in a Wheatstone bridge network such that the output voltage from the bridge network is proportional to the weight of the load carried on the surface unit. This arrangement can be used to monitor the weight of the items being heated, throughout the heating period.

11 Claims, 9 Drawing Figures

WEIGHT MEASURING ARRANGEMENT FOR COOKING APPLIANCE SURFACE UNIT

CROSS-REFERENCE TO RELATED APPLICATION

This application relates to commonly-assigned, co-pending U.S. patent application. Ser. No. 438,770 by Peter H. Smith, entitled "Method and Apparatus for Limiting the Evaporation Rate of Liquids Heated by Cooking Appliance Surface Units."

BACKGROUND OF THE INVENTION

This invention relates to a weight measuring arrangement for weighing the food loads carried on a cooking appliance surface unit.

Cooking appliances such as hotplates, cooktops, and electric ranges typically have one or more surface unit heating elements for heating foods and liquids contained in utensils which are placed on the surface units.

Knowledge of the weight of the food load to be heated by a surface unit of a cooking appliance such as an electric range would be useful to the food preparer in a number of ways, including verification of proper ingredient quantities and determining cooking times. However, in presently available cooking appliances, the user must estimate weight or use a separate weight measuring device to obtain such information. A weighing device which enables the surface unit to function as a scale platform provides an attractive convenience to the user. In addition to determining the initial weight information, food weight information measured as the food is heated by the surface unit may be used to control the cooking process by varying the power level or possibly by automatically adjusting cooking times as the weight of the food load changes during the cooking process. The requirements for a satisfactory system for this latter purpose include relatively high accuracy to measure relatively small changes in weight, which accuracy is not adversely affected by subjecting the weight sensors to relatively large temperature swings.

It is therefore a primary object of the present invention to provide a weight measuring arrangement which measures the weight of food loads placed on a cooking appliance surface unit.

It is a further object of the present invention to provide a weight measuring arrangement of the aforementioned type which is capable of determining the food load weight during the cooking process.

It is a further object of the present invention to provide a weight measuring arrangement of the aforementioned type which is capable of detecting relatively small changes in weight and which is relatively unaffected by changes in temperature from room temperature to the relatively high temperatures in the region proximate the energized surface unit.

SUMMARY OF THE INVENTION

These and other objects are accomplished by the present invention which provides in a cooking appliance support means extending beneath the surface unit heating element of the appliance constructed and arranged to flex in proportion to the combined weight of the heating unit and the load, i.e., utensil and food placed on the heating unit. Transducer means sense the flexing and generates an output signal representative of the weight supported by the support means.

In accordance with one form of the invention, the support means comprises a three-arm cantilever beam member which supports the heating element at three points to provide a controlled center of mass for the typical circular mass such as is presented by commonly-used cooking utensils. The support points are positioned at the unsupported ends of the three cantilevered arms. By this arrangement, for typical utensil food loads each arm supports one third of the total combined weight of the surface unit, utensil and food.

Strain gages are employed to measure the deformation of each arm under the combined weight. In order to achieve the desired degree of sensitivity and temperature compensation, a set of four strain gages are used, one gage being attached to each of two identical arms and the remaining two gages being attached to the third arm. The arms are constructed and arranged such that the strain measured by each of the gages secured to the third arm is one-half that measured by each of the gages secured to the two identical arms.

The gages are arranged in a four-arm bridge arrangement which generates an output voltage signal which is proportional to the sum of the strain sensed by each of the gages and thus is proportional to the total combined weight suppoorted on the surface unit.

While the novel features of the invention are set forth with particularity in the appended claims, the invention both as to organization and content will be better understood and appreciated from the following detailed description in which:

DETAILED DESCRIPTION OF THE INVENTION

Figure 1:
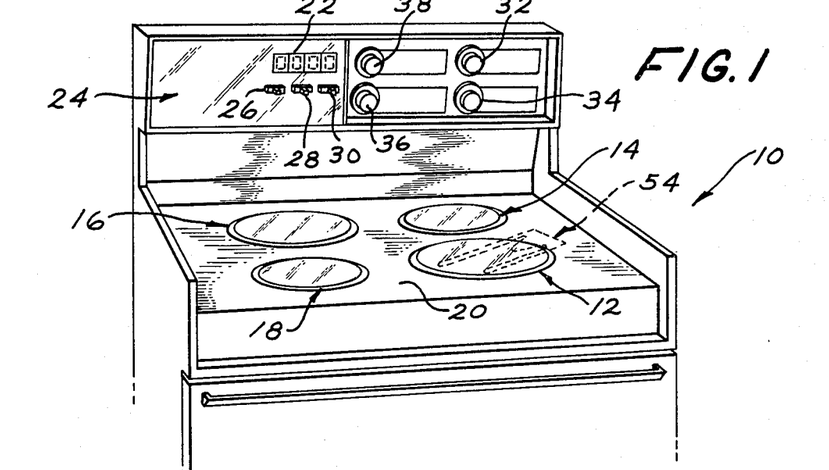
FIG. 1 is a perspective view of a portion of an electric range illustratively embodying a weight measuring arrangement of the present invention.

Referring first to FIG. 1, an electric range 10 includes four conventional solid plate electrical surface heating units 12, 14, 16 and 18. Surface units 14, 16 and 18 are supported in openings in the cooktop 20 in a conventional manner. Surface unit 12, in accordance with the illustrative embodiment of the present invention, is supported in an opening in cooktop 20 by a support means which extends beneath the heating unit and which is constructed and arranged to flex in proportion to the combined weight of the heating unit itself and the load placed on the heating unit to be heated, for example, a cooking utensil and food items contained in the utensil to be heated. Transducer means senses the flexing of the support means and generates an output signal representative of the weight supported by the support means. This signal is supplied to an appropriately programmed microcontroller which, at the option of the user, may display the weight of the food being heated or may be used to implement a method for controlling power as a function of the weight of the food being heated in a manner to be described in greater detail hereinafter.

While in the illustrative embodiment the weight measuring arrangement is employed with only one of the heating elements, it will of course be understood that the remaining heating elements could be similarly arranged. Similarly, while the surface unit of the illustrative embodiment employs a solid plate surface unit, it will be recognized by those skilled in the art that the present invention is applicable to other types of surface unit assemblies as well, including, by way of example but not limited to, conventional sheathed resistive heating elements and also induction surface units.

The digital display 22 on control panel 24 may be used for displaying weight information derived from the weight measuring surface unit arrangement. Option selection switches designated 26, 28 and 30 enable the user to select from a tare option, a weight option, and an AUTO BOIL option for the cooktop surface unit 12, the latter being a power control option, respectively. Control knobs 32, 34, 36 and 38 disposed on control panel 24 enable the user to select the desired power level for each surface unit 12, 14, 16 and 18, respectively.

Figure 2:
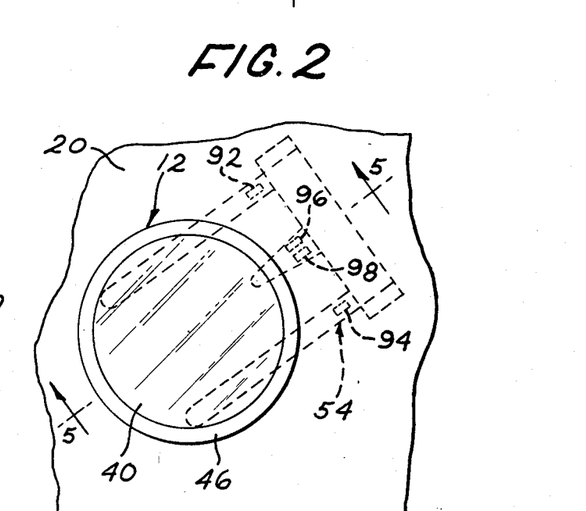
FIG. 2 is a fragmentary top view of the range of FIG. 1 illustrating a single one of the surface unit heating elements supported in accordance with one form of the present invention.
Figure 3:
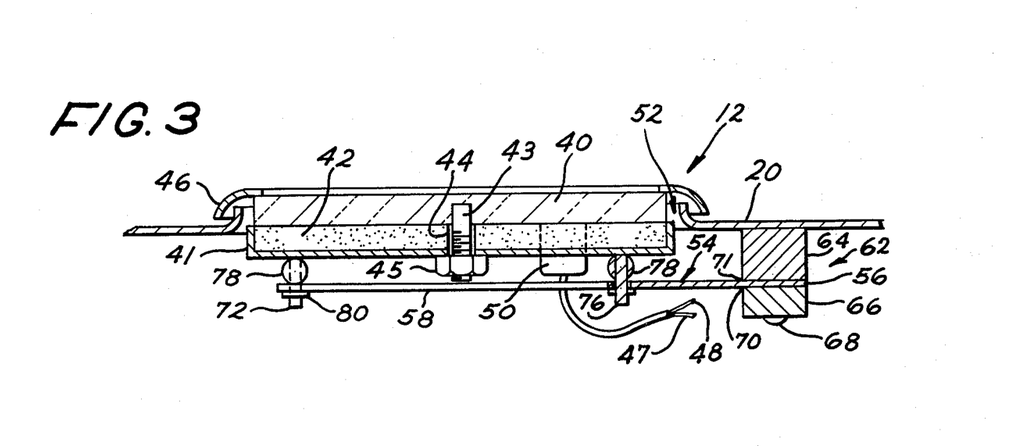
FIG. 3 is a cross-sectional elevational view of the heating element of FIG. 2.
Figure 4:
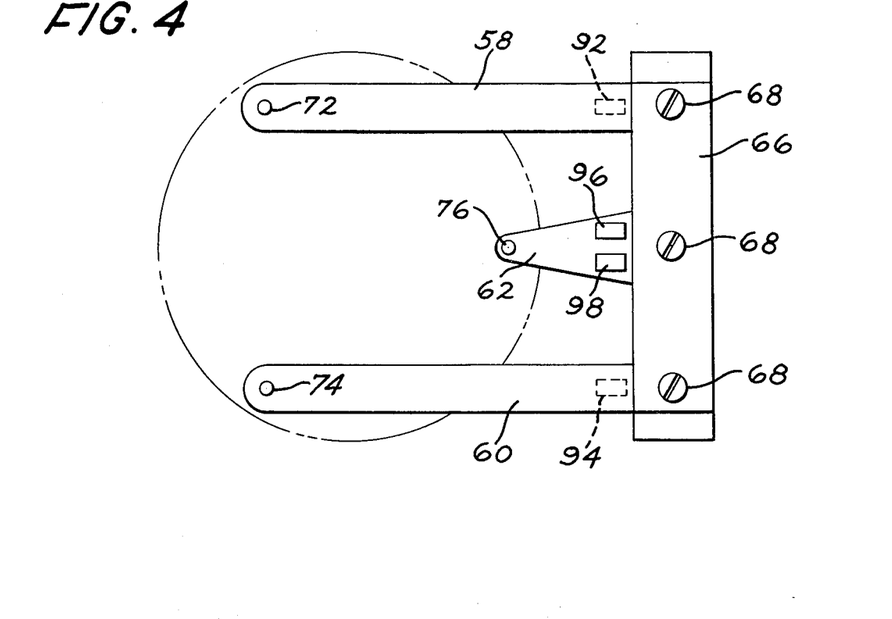
FIG. 4 is a bottom plan view of the three-arm cantilever member which supports the heating element of FIG. 2.
Figure 5:
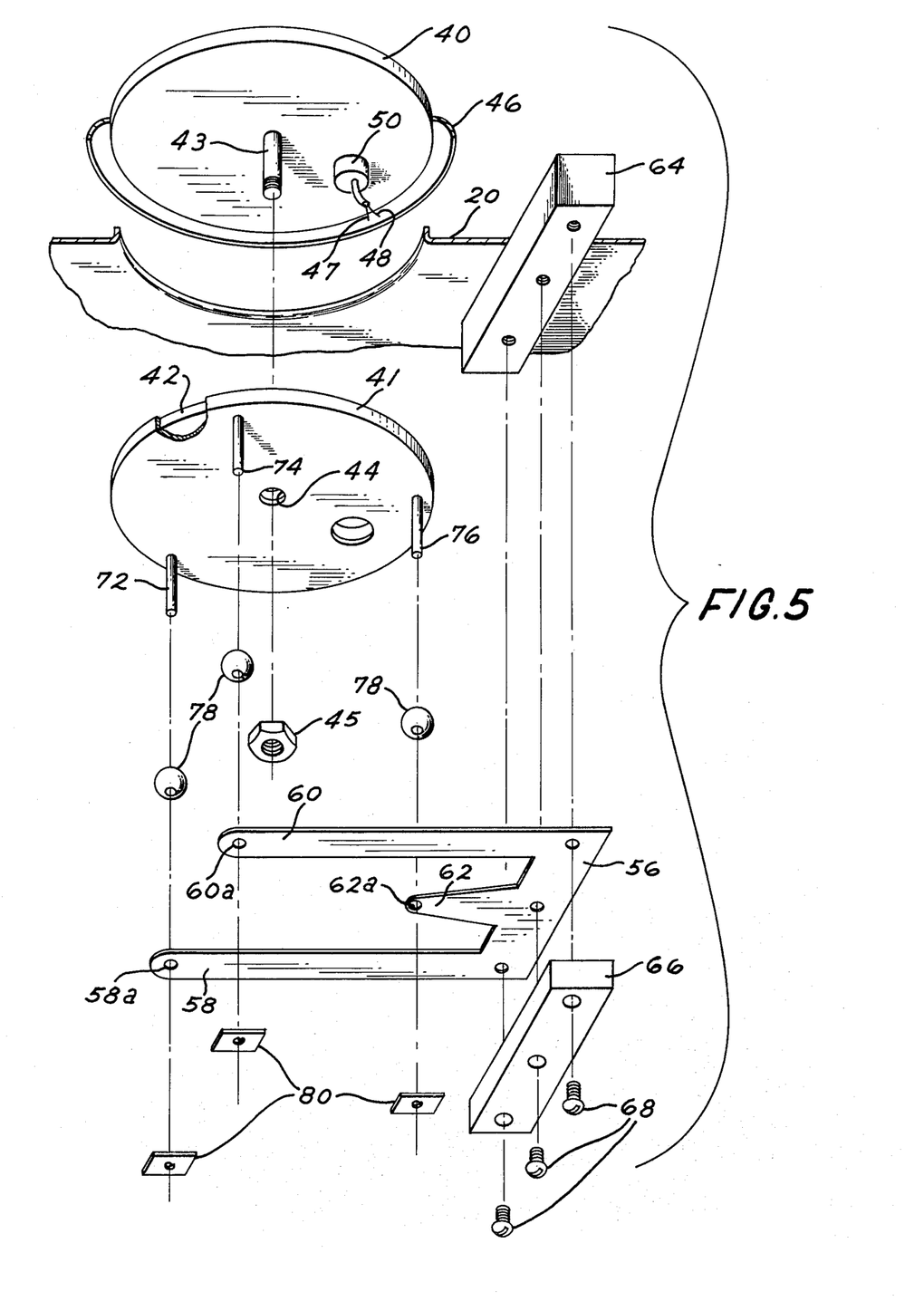
FIG. 5 is an exploded perspective view of the heating element of FIG. 2 together with its weight measuring support structure.

Referring now to FIGS. 2, 3 and 4, an illustrative embodiment of the weight measuring arrangement of the present invention will be now be described in greater detail. Since the details of the basic structure of heating unit assembly 40 are not critical to the invention, the surface unit assembly 40 is shown in simplified schematic form in the accompanying FIGURES. In the illustrative embodiment, surface unit 12 comprises a standard solid heater plate assembly 40 carried on a circular metallic pan 41 filled with an alumina insulating material 42. A central assembly stud 43 projects downwardly from solid heater plate 40 through an aligned opening 44 in the central opening in reflector pan 41. During assembly, nut 45 is threaded on stud 43 to secure pan 41 and heater plate 40 together. An appearance trim ring 46 is carried at its inner edge to the outer edge of the solid plate heater 40. Power is supplied to heater assembly 40 via insulated wire conductors 47 and 48 coupled to connector terminal 50. The exact configuration of the heating plate is not important provided that it is adapted such that the entire assembly is supported at three support points with the weight of the assembly and loads placed thereon substantially equally distributed among the three points. Solid plate heater assembly 40 can be a commercially available assembly such as that manufactured by E.G.O., a West German manufacturer. The solid plate heater assembly is attractive for such applications because of its relatively low profile and its solid heater plate. However, other standard surface heating units including induction units and the helical sheathed resistance type heating elements could be similarly used.

Surface unit 12 is supported in opening 52 of cooktop 20 by a three-armed cantilever beam member 54 to provide a three point support system for a controlled center of mass for the typically circular type loads presented by cooking utensils. Beam member 54 comprises a support base or strip portion 56, and a set of three cantilever support arms, two substantially identical outer arms 58 and 60 and a relatively short inner arm 62, all three arms projecting laterally from base portion 56. Beam member 54 is suitably secured to a fulcrum support block 62.

Support block 62 comprises two sections, an upper section 64 which is suitably secured to cooktop 20, such as by welding, and a lower section 66. Support strip 56 is tightly sandwiched between the upper and lower sections 64 and 66 with lower section 66 being secured to upper section 64, such as by screws 68, to tightly grip support strip 56 therebetween. Edge 70 of lower section 66 defines the fulcrum point for each of the cantilever arms. Section 66 must be of sufficient thickness to provide a mechanically stable fulcrum point.

Support strip 56 is secured by block 62 to cooktop 20 adjacent opening 52, such that arms 58, 60 and 62 extend beneath the opening to support heating unit 12 in the opening. A set of three metal posts 72, 74 and 76 are secured to the bottom face of pan 41 by suitable means such as by welding, one post projecting downwardly from reflector pan 41 at each of the three support points. The length of each of arms 58, 60 and 62 of cantilever member 54 is selected such that when in position on the cooktop each arm extends beneath a corresponding surface unit support point, with holes 58a, 60a and 62a formed in arms 58, 60 and 62, respectively, receiving the associated posts 72, 74 and 76, respectively. Spherical support balls 78 of a thermally insulating, ceramic material are carried on the posts 72, 74 and 76 sandwiched between the associated cantilever arm and the reflector pan 41. A retainer clip 80 is secured to each post to secure the support posts in position.

The three arms 58, 60 and 62 of cantilever beam member 54 are each constructed and arranged to flex or deflect when a weight, such as a cooking utensil, is placed on surface unit 12 by an amount proportional to that weight. In order to provide level support for loads placed on the surface unit, all three arms must deflect an equal vertical distance in response to equal weight supported therefrom. However, as will be described in greater detail hereinafter, each arm is configured such that for equal vertical deflections the strain characteristic exhibited by outer arms 58 and 60 are substantially identical and the strain characteristic exhibited by inner arm 62 is substantially one-half that exhibited by each of the outer arms, in order to facilitate the use of a balance Wheatstone bridge strain gage arrangement.

Transducer means comprising strain gages 92, 94, 96 and 98 are used to sense the flexing of support arms 58, 60 and 62. The use of four strain gages in a balanced Wheatstone bridge arrangement to measure strain is well known. Advantages from such as arrangement include an amplified output for greater sensitivity and temperature compensation where all four gages are exposed to the same thermal environment. However, the present arrangement marks a significant departure from the conventional Wheatstone bridge strain gage arrangement in that a four element bridge network is used with a three arm support system. The three arm support arrangement is made compatible with the four arm bridge network by using one gage each with two of the support arms and two gages with the remaining arm. Specifically, gages 92 and 94 are secured to the upper surface of arms 58 and 60, respectively, proximate edge 71 of mounting block 64. Gages 96 and 98 are arranged side by side on arm 62 on the opposite surface of member 54 proximate edge 70 of block 66.

Figure 6:
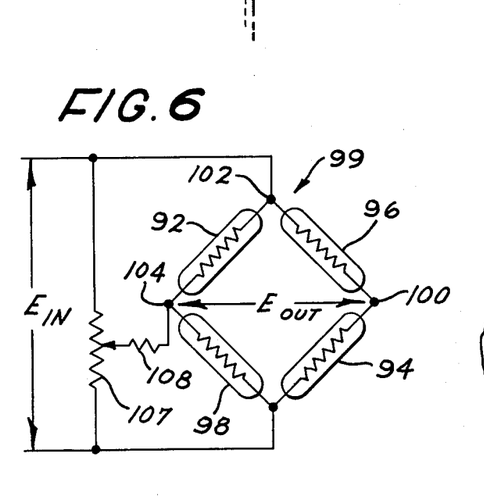
FIG. 6 is a simplified schematic circuit diagram of the bridge network formed by the strain gages carried on the cantilever member of FIG. 4.

FIG. 6 shows strain gages 92, 94, 96 and 98 electrically connected in a Wheatstone bridge network 99 with one gage in each of the four branches of the bridge. Gages 92 and 94, comprising one set of gages, sense the strain of outer arms 58 and 60, respectively, and gages 96 and 98, comprising the other set of gages, sense the strain of inner arm 62. The gages in each set are connected at opposite branches of the bridge network such that the output signal from the bridge taken from terminals 100 and 104 is proportional to the sum of the strain sensed by each of the individual gages, which in turn is proportional to the combined weight. However, this combined weight includes the weight of the heating unit assembly itself, in addition to whatever load is placed on the surface unit. It is desirable to balance the bridge network at the time of circuit assembly such that the output voltage is zero when only the surface unit is supported by beam member 54. Adjustable resistor 107 and resistor 108 enable the calibration of bridge network 99 during appliance assembly to null out the voltage differential resulting from the weight of the surface unit supported by cantilever support member 54. By appropriately adjusting resistor 107, the voltage across terminals 100 and 104 will be zero when only the weight of the surface unit is supported by member 54.

In the illustrative embodiment, the strain gages are of the conventional type manufactured by Magnaflux Incorporated, Chicago, Ill., available under the Part No. PA-03-125A-350. Strain gages of this type are essentially comprised of a resistive element characterized by an electrical resistance value which increases when the gage is elongated as a result of tension and which value decreases when the gage is shortened due to compression. Branches having the gages 92 and 94 which are secured to the upper side of the cantilever beam member are connected at the opposite ends thereof to the branches having the gages 96 and 98 therein. Thus, downward deflection of the cantilever beam members resulting from the placement of a utensil on the surface unit causes the resistance of gages 92 and 94 to increase due to elongation of the gage and at the same time causes the resistance of gages 96 and 98 to decrease due to the compression thereof. Since the resistance of gage 96 becomes smaller and at the same time the resistance of gage 94 becomes larger, the voltage across the terminals 100 and 102 decreases by an amount proportional to the sum of the changes in the resistance of gages 94 and 96. Likewise, if the resistance of gage 98 becomes smaller due to compression and the resistance of the gage 92 becomes larger due to elongation, the voltage across terminals 104 and 102 increases by an amount proportional to the sum of the changes in resistances of the gages 92 and 98. Since the change in the voltage at terminal 104 is opposite in sign to that at terminal 100, the potential difference across terminals 100 and 104 is increased by an amount proportional to the sum of the change in resistance of all four gages.

In this arrangement, each of strain gages 92, 94, 96 and 98 is subjected to a common thermal environment, causing the change in resistance of each of the gages due to the temperature of that environment to be the same. Thus, errors due to changes in resistance as a result of temperature are cancelled by the bridge circuit, thereby providing thermal compensation for the output signal from the bridge.

Since the surface unit is arranged such that the weight supported thereon is essentially, for most uniform loads, equally distributed among the three support points, the deflection of each arm is porportional to one-third of the total weight. Thus, the change in resistance of each of the strain gages 92 and 94 mounted to the outer arms 58 and 60 is intended to be proportional to one-third of the total weight. However, the total change in resistance of the two resistances secured to the inner arm 62 must be proportional to one-third of the total weight. Thus, the change in resistance of each must be proportional to one-sixth of the total weight. Consequently, the structure of cantilever beam member 54 is constructed and arranged such that the two outer arms 58 and 60 each exhibit substantially identical strain characteristic as measured by gages 92 and 94, and the third arm 62 exhibits one-half of the strain of the outer arms as measured by gages 96 and 98 when all three arms are deflected equally by the combined weight of the utensil, heating unit and food in the utensil supported from cantilever beam member 54.

In the illustrative embodiment, cantilever member 54 is fabricated from a piece of sheet metal such that the entire member is of comparable elastic modulus. The length of each of the arms is dictated by the location of the support points to provide the controlled center of gravity. Thus, in the illustrative embodiment, to achieve the desired strain characteristic for the inner arm 62, a tapered beam configuration is employed with the thickness of the arm, the width of the arm at the fulcrum point and the width at the support point being determined by applying a regression technique to well known structural mechanics relationships for a tapered cantilevered beam. As best seen in FIG. 2, the width of inner arm 62 tapers from a relatively wide width dimension at the fulcrum point to a relatively narrow width dimension at the support point at the free end of the inner arm. In the illustrative embodiment, the cantilever beam member has a substantialy uniform thickness, of 0.1875 inches, except for inner beam 62. The outer arms are 7 inches in length and 1.0 inch in width. The inner arm has a thickness of 0.097 inches, a width at the fulcrum point (edge 70) of 1.45 inches, a length of 2.5 inches from the fulcrum point to the support point (post 76), and a width at the support point of 0.5 inches. Deflection for all three arms is to be on the order of 0.08 inches for a load of 12 pounds. The modulus of elasticity of the beam material is approximately $1.06 \times 10^6$ pounds per square inch. The strain gages 92, 94, 96 and 98 are each located approximately 0.6 inches from edge 70.

Figure 7:
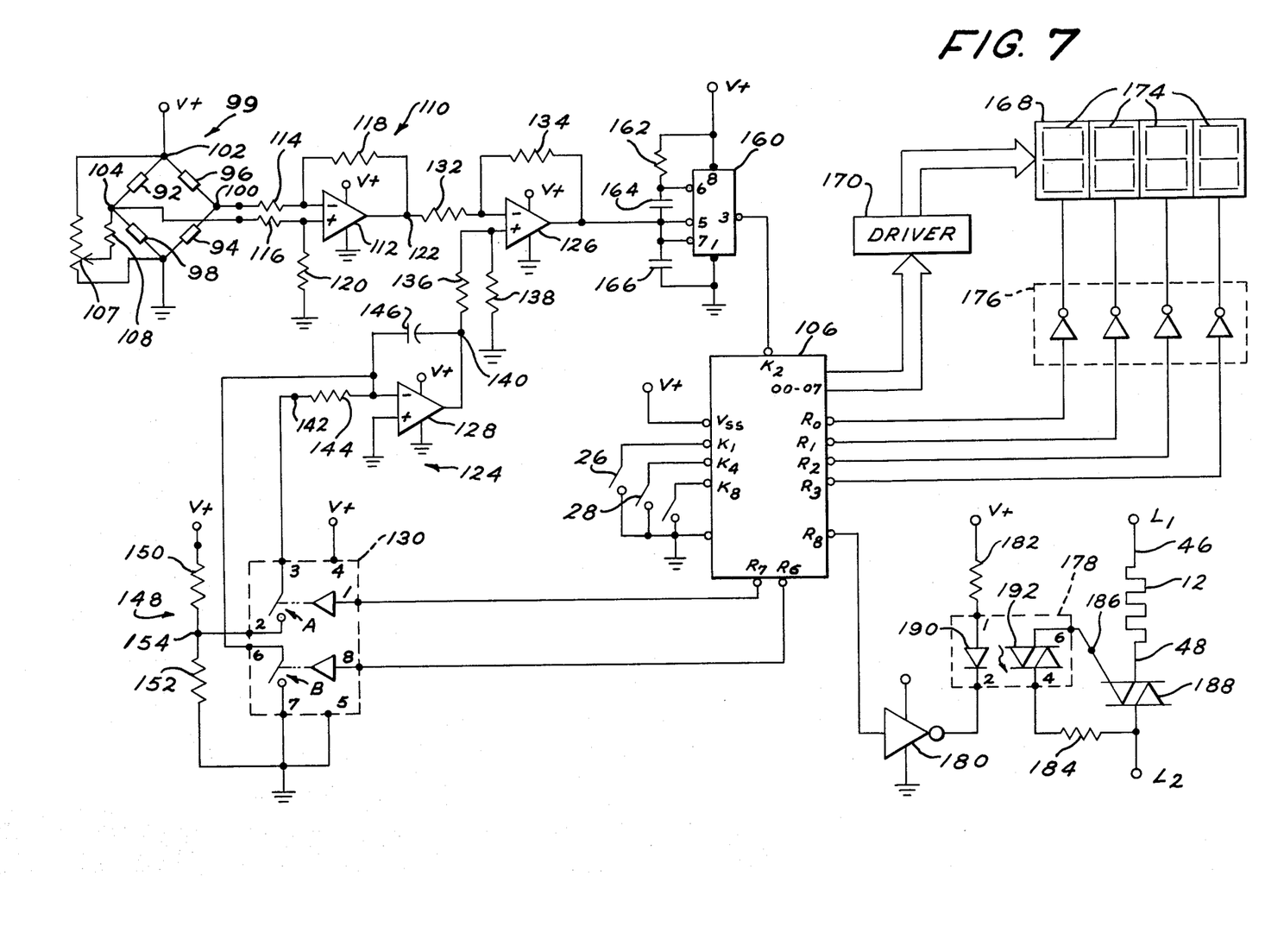
FIG. 7 is a simplified schematic circuit diagram of a power control circuit for the heating element of FIG. 2 incorporating the bridge network of FIG. 6.

Referring now to FIG. 7, the bridge network 99 of FIG. 6 is incorporated in a microprocessor based control circuit arrangement which, at the user's option, utilizes the weight information derived from the bridge network output voltage signal to display the gross weight of the food load or the net weight of the food load, and/or to implement a method of controlling power to the surface unit as a function of the rate of change of the weight of the food load sensed by the bridge network during the heating period.

Before describing the circuit of FIG. 7, the weight determination functions performed by circuit will be briefly described. The three option selection switches 26, 28 and 30 on control panel 24 enable the user to select from a tare option, a weight option, and an AUTO BOIL option, respectively. The weight option enables the display of the gross weight of the load placed on the surface unit; that is, the combined weight of the utensil and its contents. The tare option enables the display of the net weight of the contents of the utensil. To implement the weight option, the user merely places the loaded utensil on the surface unit and actuates selection switch 26. The gross weight of the utensil and its contents will then be displayed. To implement the tare option, the user first places the empty utensil on heating element 12 and actuates switch 28. Microprocessor 106 then automatically adjusts the weight measuring circuitry to null out the utensil weight, and causes a display of all zeros to be displayed. The user then places the load to be heated in the utensil. This may be done either with the utensil in position on the surface unit or by removing the utensil. With the loaded utensil positioned on the surface unit, the user actuates switch 26 signifying to the microprocessor that a weight determination is desired. The microprocessor then processes the input signal from the bridge network and displays a weight value corresponding to the net weight of the food placed in the utensil.

Referring now to FIG. 7, bridge network 99 is energized by a regulated dc voltage supply V+ which in the illustrative embodiment is 15 volts. As herein before described, the voltage signal derived across terminals 100 and 104 is proportional to the weight supported by cantilever member 54, calibrated by proper adjustment of the resistor 107 to null out the weight of the surface unit.

The output signal across terminals 100 and 104 is applied to a differencing circuit designated generally 110 which comprises an operational amplifier 112 connected in a conventional difference amplifier configuration. Resistors 114 and 116 couple the terminals 100 and 104 to the inverting (−) and non-inverting (+) inputs, respectively, of amplifier 112. Feedback resistor 118 connects the output of amplifier 112 to its inverting input. Resistor 120 couples the non-inverting input to system ground. In this arrangement, the gain of the differential circuit is determined by the ratio of feedback resistor 118 to resistor 114. Resistors 116 and 120 are matched to resistors 114 and 118, respectively, for satisfactory common mode rejections. The voltage differential from bridge network 99 applied to the inputs of amplifier 112 is in the range of 0-10 millivolts for weights from 0 to 15 lbs. The ratio of resistor 118 to resistor 114 is chosen to provide a gain of 50, resulting in an amplifier output signal at terminal 122 in the range of 0-5 volts.

The output of amplifier 112 is applied to a tare circuit, designated generally 124, comprising essentially operational amplifiers 126 and 128 and analog switch 130. The function of tare circuit 124 is to raise the voltage applied to the non-inverting input of amplifier 126 to a tare level sufficient to null out the utensil weight voltage applied to the inverting input of amplifier 126 and hold the non-inverting input voltage at that tare level to enable a net weight measurement. Amplifier 126 is connected in a conventional difference amplifier configuration. The voltage signal from terminal 122 is coupled to the inverting input of amplifier 126 by resistor 132. Feedback resistor 134 is coupled between the output of amplifier 126 and its inverting input. A tare voltage signal from amplifier 128 is coupled to the non-inverting input of amplifier 126 by resistor 136. Resistor 138 couples the non-inverting input of amplifier 126 to system ground. Resistors 132, 134, 136 and 138 are of equal resistance to provide a unity gain differential amplifier configuration. The output of amplifier 126 represents the difference between the weight signal at terminal 122 and the tare signal at terminal 140, the output of amplifier 128. It will be apparent that if, while the tare signal representing the weight of the empty utensil is held at terminal 140, the empty utensil is filled with the food load to be weighted, the weight signal at terminal 122 then represents the gross weight of the utensil and food load, and the output of amplifier 128 then represents the difference between the gross weight of the loaded utensil and the tare weight of the utensil, i.e., the net weight of the contents of the utensil.

The tare signal is generated by operational amplifier 128 which is connected in a conventional integrator configuration. The output signal at terminal 140 is substantially proportional to the integral over time of the input signal at terminal 142 which is coupled to the inverting input of amplifier 128 by resistor 144. Capacitor 146 couples the output of amplifier 128 to its inverting input. Capacitor 146 and resistor 144 determine the proportionately constant between the input voltage at terminal 142 and the output voltage at terminal 140.

When a tare is desired, a dc voltage is applied to the inverting input of amplifier 128 and maintained at that input until the output voltage at 140 reaches the desired level, at which time the input voltage signal is removed, and the output voltage holds at that level. In the embodiment of FIG. 7, the dc voltage is derived from vltage divider 148 comprising resistors 150 and 152, which is energized by the V+ 15 volt regulated voltage supply. Terminal 154 of voltage divider 148 is coupled to input terminal 142 of amplifier 128 by internal switch A of analog switch 130. Switch A functions as a normally open switch internally coupling pin 2 and pin 3 of switch 130. The state of internal switch A is controlled by an actuating signal applied to pin 1. When switch A is closed, the voltage at terminal 154 is applied to terminal 142. Thus, to initiate a tare determination, microprocessor 106 outputs an actuating signal at output port R7, which is connected to pin 1 of switch 130, and monitors the frequency at input port K2. This closes switch A, causing the voltage at terminal 140 to rise. When the voltage at terminal 140 rises to the null level, that is the level which nulls the utensil weight, the frequency at K2 signifies a zero weight. The microprocessor, upon detecting the zero weight input frequency, removes the actuating signal from port R7, thereby opening switch A. There being no closed discharge path for capacitor 146, the voltage at terminal 140 is effectively held at the tare level.

The tare circuit is reset by closure of internal switch B of switch 130 which is a normally open switch coupling pin 6 to pin 7. Switch B couples capacitor 146 to system ground. Thus, when switch B is closed by a reset signal at pin 8, capacitor 146 is rapidly discharged and the tare circuit is then reset. Microprocessor 106 resets the tare circuit by generating a reset signal at output port R6 which is connected to pin 8 of switch 130. Switch 130 in this embodiment is a quad SPST JFET analog switch device commercially available as an integrated circuit from National Semiconductor, identified by the Order Number LF 11331.

Weight information derived from bridge network 99 and processed by circuits 110 and 124 remains in analog form at the output of amplifier 126. The voltage signal is converted to a frequency which varies as a function of the voltage level for input to microprocessor 106 by voltage controlled oscillator (VCO) 160 which generates an output signal in the form of a square wave having a frequency which is linearly proportional to its input voltage. In the illustrative circuit of FIG. 7, VCO 160 is an integrated circuit commonly referred to as a 566 VCO, commercially available from many manufacturers. The IC used in FIG. 6 is available from National Semiconductor by the ID Number LM566.

The output signal from amplifier 126 is connected to modulation input pin 5 of VCO 160. A regulated dc supply voltage V+ is applied to pin 8 of VCO 160. Timing resistor 162 couples the supply voltage to pin 6. Capacitor 164 is connected between pins 5 and 6 to prevent parasitic oscillations that may occur during VCO switching. Timing capacitor 166 is connected between pin 7 and system ground. Pin 1 is coupled directly to system ground. The square wave output signal is provided at pin 3.

This output signal at pin 3 will have a frequency which is linearly proportional to the voltage applied to pin 5 which in turn is linearly proportional to the weight as sensed by bridge network 99. This square wave signal is applied to input port K2 of microprocessor 106. In the illustrative embodiment, circuit parameters are selected to provide a frequency range of 1 KHz to 5 KHz for the input voltage range of 0–5 volts.

Microprocessor 106 in the illustrative embodiment of FIG. 7 is a TMS 1100 microprocessor readily commercially available as a single chip integrated circuit from Texas Instruments. Technical details concerning the general characteristics of microprocessor 102 are available in a Texas Instruments, Inc. publication entitled, "TMS 1000 Series Data Manual," published in December 1975. Microprocessor 106 has been customized by permanently configuring its read only memory (ROM) to process the input signal at K2, to display weight information derived from the signal at K2 to the user and to use that weight information to carry out a power control method to be described in greater detail hereinafter.

A conventional 4-digit seven segment display 168 is employed in the circuit of FIG. 7 to display weight information derived from bridge network 99. Display data multiplexed with the decoded seven segment data is provided at output ports 00–07 of microprocessor 106 and coupled to the display circuitry 168 via conventional segment driver circuitry designated 170. The output signal for driving each of the four digits 174 is provided at output ports R0–R3 of microprocessor 106, which are coupled to the display via conventional driver circuitry 176. The multiplexing of the multi-digit display data may be performed by a microprocessor in any conventional manner well known in the art.

Microprocessor 106 controls the power applied to surface unit heating element 12 by trigger signals provided at output port R8. This signal is coupled to pin 2 of an opto-isolator circuit 178 via inverting buffer amplifier 180. Pin 1 of opto-isolator 178 is coupled to a regulated supply voltage V+ via current limiting resistor 182. The output return pin 4 of opto-isolator 178 is coupled to power line L2 via current limiting resistor 184. Pin 6 is coupled to the gate terminal 186 of a triac switching device 188 which is connected in series with heating element 12. A trigger signal at R8 is amplified by amplifier 180 to forward bias light emitting diode 190 of switch 178, which in turn switches the bipolar switch portion 192 of switch 178 into conduction, thereby applying a gate signal to power control triac 188, switching it into conduction to energize heating element 12.

Microprocessor 106 is programmed to implement a plurality of power levels by varying the frequency of the trigger signals at R8 to control the duty cycle of the heating element, a predetermined duty cycle being associated with each power setting. Any one of many well known techniques for controlling the power to the heating element may be used. In the illustrative embodiment, duty cycle control is designed to provide ten power levels ranging from 10 percent to 100 percent power in increments of 10 percent.

The following component values are believed suitable for use in the circuit shown in FIG. 7. These values are exemplary only, and are not intended to limit the scope of the claimed invention.

| Strain Gages 92, 94, 96, 98 | | Magnaflux PA-03-125AH-350 | |
|---|---|---|---|
| Fixed Resistors | | | |
| 108 | 100K ohms | 138 | 47K ohms |
| 114 | 330 ohms | 144 | 1 M ohm |
| 116 | 330 ohms | 150 | 15K ohms |
| 118 | 16.5K ohms | 152 | 6.8K ohms |
| 120 | 16.5K ohms | 162 | 10K ohms |
| 132 | 47K ohms | 182 | 220 ohms |
| 134 | 47K ohms | 184 | 220 ohms |
| 136 | 47K ohms | | |
| Variable Resistors | | | |
| 106 | | 100K ohms | |
| Capacitors | | | |
| 146 | | 10 mfd. | |
| 164 | | .001 mfd. | |
| 166 | | .015 mfd. | |
| Operational Amplifier | | | |
| 112, 126, 128 | | National Semiconductor LM 308 Integrated Circuit | |
| 180 | | ULN 2004A Integrated Circuit | |
| Analog Switch | | | |
| 130 | | National Semiconductor LF 11331 Integrated Circuit | |
| Opto-Isolator | | | |
| 178 | | Integrated Circuit MDC 3020 | |
| Microprocessor | | | |
| 106 | | Texas Instruments Integrated Circuit TMS 1100 | |
| Voltage Controlled Oscillator | | | |
| 160 | | National Semiconductor Integrated Circuit LM 566 | |
| Triac | | | |
| 188 | | General Electric Company SC147 | |

As mentioned briefly herebefore, in addition to weight measurement and display, the microprocessor is also programmed to carry out a novel power control method which is particularly useful when the food load to be heated includes a liquid which is to be brought to a boil. Typically, when heating such loads, such as when boiling water, the user places the utensil containing the liquid on the surface unit and selects the maximum power setting for the surface unit to bring the liquid to a boil as rapidly as possible. Once the liquid is boiling, the user then manually adjusts the power to a lower power setting to sustain the boil for the desired period. The AUTO BOIL cycle to be described hereinafter operates the heating element at full power until evaporation begins and thereafter periodically automatically lowers the level of power applied to the heating element until reaching the lowest level which will substantially sustain a predetermined relatively low boil rate.

In carrying out this method, the control system monitors the weight of the contents of the utensil. The weight remains essentially constant until the boiling point is reached. As the liquid evaporates, the weight decreases at a rate determined by the evaporation rate. The output from the bridge network is periodically sampled. When an initial weight decrease at a rate greater than the desired evaporation rate is detected, the power level is reduced to the next highest power level. If the next measurement indicates a rate of decrease which is still greater than the desired rate, the power level is decreased again. This process continues until a power level is reached, at which the weight is no longer decreasing at a rate greater than the desired rate. At this point, the power setting is increased to the next higher power setting and remains at that setting until a weight decrease at a rate greater than the desired rate is detected. Typically, the power level will oscillate between the lowest setting which sustains an evaporation rate greater than the desired rate and the next lower setting, until the heating process is terminated by the user.

Figure 8:
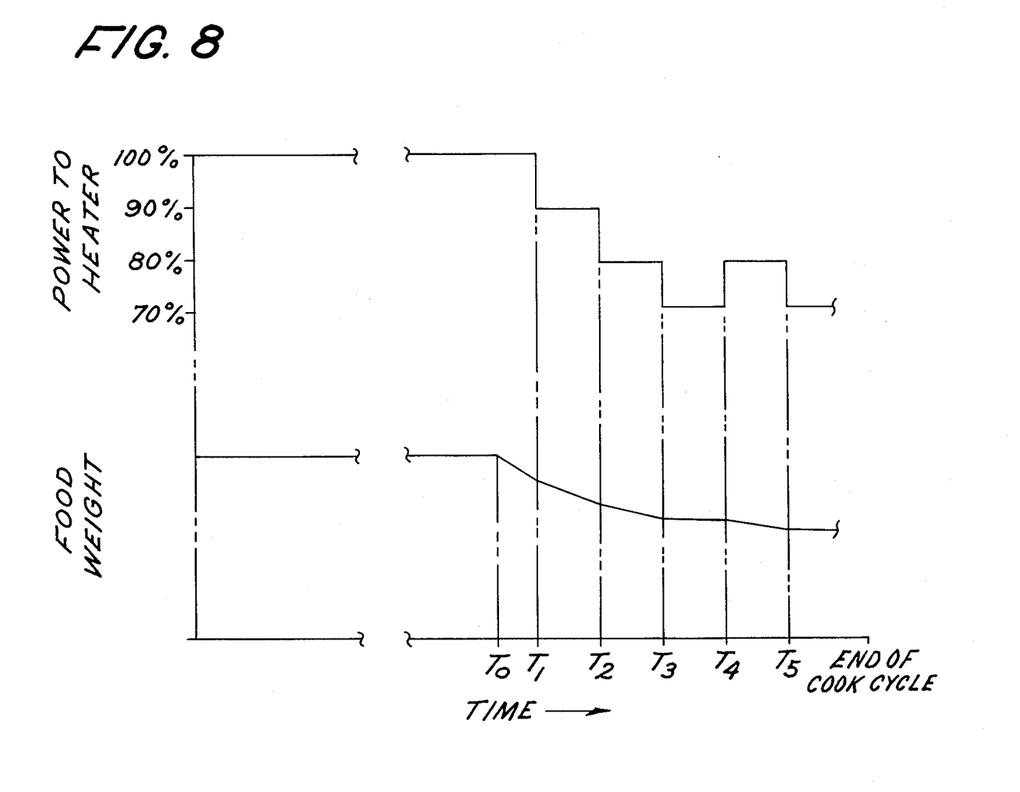
FIG. 8 is a graph depicting a power applied to the heating element and weight of food being heated as a function of time to illustrate an illustrative method of controlling power to the heating element as a function of the rate of change of the weight of the food being heated.

The graph of FIG. 8 illustrates this method. Initially, the heating element is operated at the maximum power level. The weight of the food load remains substantially constant until reaching its boiling point at time $T_o$. The resulting decrease in the weight of the food load as the liquid content evaporates at a rate greater than the desired rate is first detected at time $T_1$, at which time the power level is reduced by 10 percent to the next lower power level. When the weight is sampled again at $T_2$ and $T_3$, a rate of decrease greater than the desired rate is again detected and the power level is decreased in 10 percent increments. At time $T_4$, a decrease rate greater than the desired rate is not detected. The power level is thus increased 10 percent. At time $T_5$, a decrease rate greater than the desired rate is again detected and the power level is again decreased. This process is repeated until terminated by the user.

Figure 9:
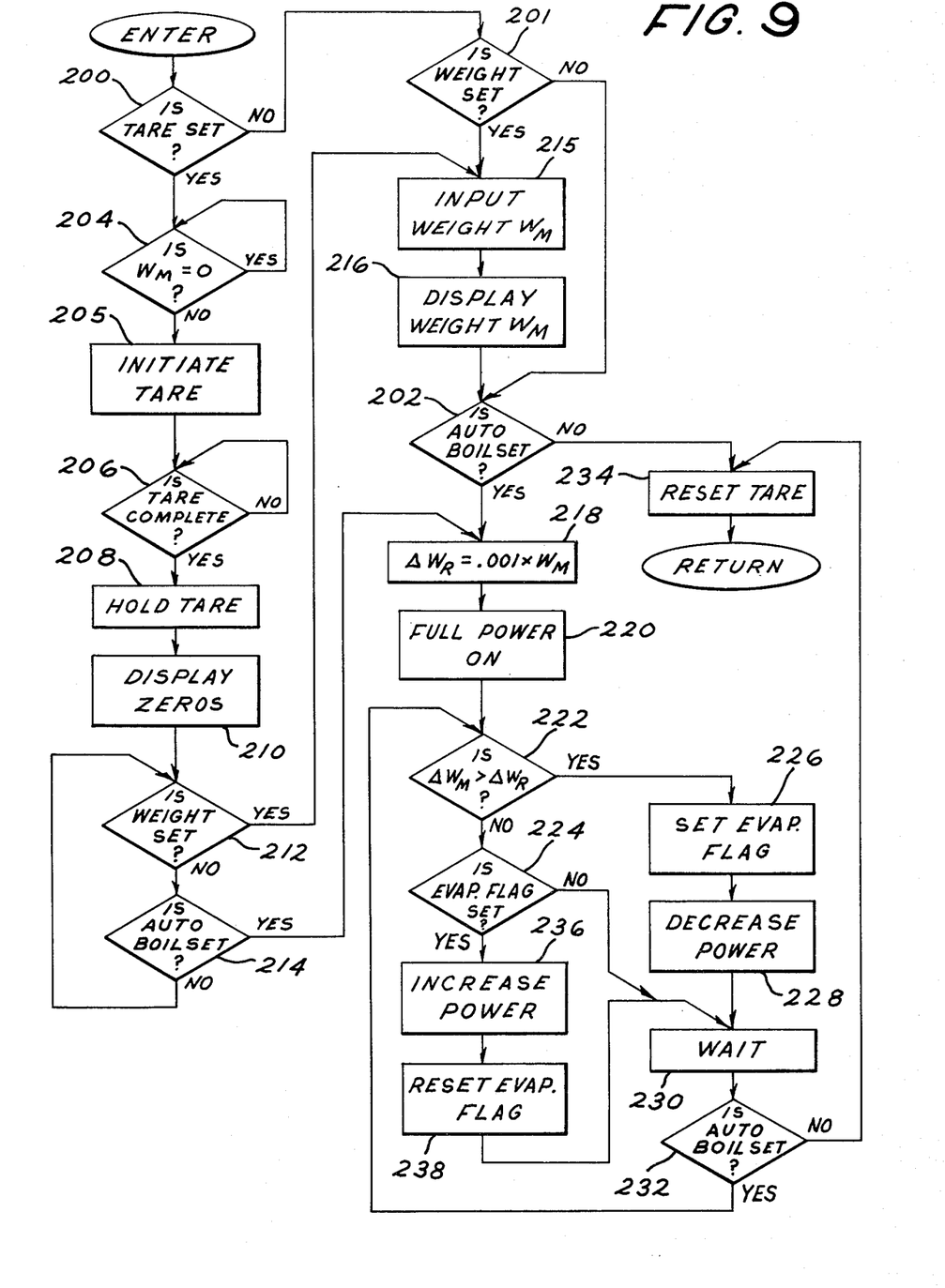
FIG. 9 is a program flow diagram illustrating a control routine employed in the microprocessor of the control circuit of FIG. 7 to display weight information and to control power to the heating element as a function of the rate of change of the weight of the food being heated.

Operation of the circuit of FIG. 7 will now be described with reference to the flow diagram of FIG. 9. This flow diagram illustrates the algorithm which is implemented in a portion of the ROM of microprocessor 106. From this diagram, one of ordinary skill in the programming art can prepare a set of instructions for permanent storage in the ROM of microprocessor 106. It is of course to be understood that other portions of the microprocessor ROM may be utilized to carry out additional control functions such as implementing the power level selection input by the user for heating elements when the range is used for conventional heating purposes.

The user selects the desired one of the tare, weight and AUTO BOIL options by actuating switches 26, 28 or 30, respectively. Microprocessor 106 is programmed to periodically enter the weight routine illustrated in FIG. 9. Upon entering the routine, Inquiry 200 checks input port K1 to determine if the tare option has been selected. If not, Inquiry 201 checks input port K4 to determine if the weight option has been selected. If neither the tare nor the weight option has been selected, Inquiry 202 checks input port K8 to determine if the AUTO BOIL option has been selected. If none of these options has been selected, the program resets the tare circuit and returns to the main control program.

In order to determine the net weight of the food items to be heated in a cooking utensil, the user first places the empty utensil on heating element 12 and actuates the tare switch 26. This selection is detected by Inquiry 200, and Inquiry 204 determines whether a utensil has been placed on surface unit 12 by checking the frequency of the signal applied to input port K2, and waiting until the frequency is greater than 1 KHz, indicating that a load has been placed on the surface unit resulting in a measured weight $W_M$, greater than zero. Upon detecting such a frequency, microprocessor 106 initiates the tare determination (Block 205) by generating a trigger signal at output port R6. The trigger signal at R6 closes internal switch A of analog switch 130 causing the tare voltage at the output of integrating amplifier 128 to rise. Inquiry 206 delays the program until the frequency of the signal at K2 drops to less than 1 KHz signifying that the tare signal from amplifier 128 has risen to a level substantially equal to the voltage signal from amplifier 122 representing the weight of the utensil. Upon detection of this condition, the tare voltage at the non-inverting input is held at that level by terminating the trigger signal at R7 (Block 208), thereby opening switch A of analog switch 130. Next, all zeros are displayed by display 168 (Block 210) indicating to the user that the tare determination has been completed. The program then determines whether the user has selected the weight determination option by closing switch 28 (Inquiry 212) or the AUTO BOIL option by closing switch 30 (Inquiry 214). If neither has been selected, the program waits until the user deactuates the tare switch 26 and actuates either the weight switch 28 or the AUTO BOIL switch 30. In the next step in the net weight measurement, the user having observed the display of all zeros deactuates the tare switch and then places the contents to be weighed in the utensil. This may be done with the utensil on the surface unit or the user may remove the utensil. With the loaded utensil in place on the surface unit, the user then actuates switch 28 to initiate a weight determination. The weight switch 28 having been actuated, the frequency of the signal at input K2 to microprocessor 106 representing the weight of the load on the surface unit 12 is determined (Block 215) and this weight is displayed by display 168 (Block 216). Since the tare voltage of the non-inverting input of amplifier 126 has been adjusted to null the weight of the utensil, the frequency of the signal at K2 now represents the net weight contents of the utensil.

Of course, the user could determine the gross weight of utensil and contents, if desired, by actuating switch 28 directly without first selecting the tare option, in which case the program would be entered via Inquiries 200–201. The weight information input at K2 (Block 215) and displayed (Block 216) would then represent the gross weight of the utensil and its contents since the tare voltage would be zero.

Having displayed the weight, or determined that neither the tare option or the weight option has been selected, the program then determines whether the AUTO BOIL option has been selected (Inquiry 202); if not, the program exits the subroutine. If the AUTO BOIL option has been selected, the microprocessor 106 implements the hereinbefore generally described method of varying the power level applied to the heating element as a function of the rate of evaporation of liquids being heated so that the power level is automatically maintained at the level needed to maintain a minimum rate of evaporation.

In carrying out this method, the reference change in weight $\Delta W_R$ representing the desired evaporation rate must be determined. The desired minimum evaporation rate for the liquid being heated is set at a predetermined percent per measurement interval. As will be further described hereinafter, a measurement interval of 30 seconds is employed in this embodiment. The desired evaporation rate is somewhat arbitrarily set at 12 percent of the initial weight per hour which corresponds to 0.10 percent per 30 second measurement interval. Thus, the reference value $\Delta W_R$ is set at 0.10 percent of the initial weight. If the change in weight in any measurement interval exceeds this value, that signifies an evaporation rate higher than the desired rate. For example, if the initial weight of the liquid to be heated is 2 lbs., the reference value $\Delta W_R$ would be 0.002 lbs. per measurement interval.

Referring again to FIG. 9, the reference value $\Delta W_R$ is calculated at the beginning of the AUTO BOIL cycle (Block 218) with $W_M$ representing the initial net weight of the liquid or liquid and food load to be heated. Next, the triac trigger signals output at R8 are generated to implement the maximum power level for heater 12 (Block 220). The weight of the food load sensed by the bridge network as represented by the frequency of the signal at K2 is checked by the microprocessor and subtracted from the immediately preceding weight measurement to compute $\Delta W_M$ the amount of the decrease in the measured weight $W_M$ since the last measurement. This $\Delta W_M$ is compared to the reference decrease $\Delta W_R$ (Inquiry 222). During the initial portion of the cycle, a No to Inquiry 222 signifies that the boiling point has not been reached. Since no decrease greater than $\Delta W_R$ has yet been detected, the evaporation flag is not yet set (Inquiry 224) and the program loops via Block 230 and Inquiry 232, to be described hereinafter, waiting for that initial decrease. Upon detection of the first decrease in the measured weight $\Delta W_M$ greater than the reference decrease $\Delta W_R$ in the measured weight $W_M$ signifying the boiling point has been reached and rapid evaporation has begun, the evaporation flag is set (Block 226) and power is decreased (Block 228) from the full power setting to the next lower setting and the program waits for a predetermined sampling interval before taking the next weight measurement (Block 230). This interval between measurements allows the food load and heating element to reach a steady state operating condition at the new power level. A sampling interval on the order of 30 seconds is considered sufficient for most typical food loads likely to be heated using this option. If the next measurement indicates $W_M$ has decreased between measurement intervals by an amount greater than $\Delta W_R$ (Inquiry 222), power is again reduced (Block 228). This process continues until no decrease in $W_M$ greater than $\Delta W_R$ is detected. At this stage of the cycle, having already reached the boiling point, the Evap Flag is set (Inquiry 224). Thus, when the condition of no weight decrease greater than $\Delta W_R$ is detected, power is increased by one power level (Block 236) to the next higher power level, which level represents the lowest level sufficient to maintain an evaporation rate above the reference rate. The Evap Flag is reset (Block 238). $W_M$ continues to be periodically sampled. Typically, the power level will oscillate between the lowest power setting at which no decrease greater than $\Delta W_M$ is detected and the next higher power setting for the balance of the cooking period until the user terminates the AUTO BOIL mode by deactuating the AUTO BOIL switch 30. Inquiry 232 checks input port K8 to see if switch 30 has been deactuated. If not, the program returns to Block 218 for the next weight change determination. If the switch 30 has been deactuated, the tare circuit is reset (Block 234) by generating a reset signal at output port R6 which closes internal switch B of switch 130 to discharge capacitor 146 and remove the tare signal voltage, and the program exits the subroutine.

It is apparent from the foregoing that the present invention provides a relatively simple, effective weight measuring arrangement for an electric cooking appliance which enables the user to conveniently weigh food loads to be heated on cooktop surface units, both before and during the cooking process, as well as making the weight information available to effectuate heating element power control as a function of the weight of the food items being heated.

While a specific embodiment of the invention has been illustrated and described herein, it is realized that modification and changes will occur to those skilled in the art to which the invention pertains. It is therefore to be understood that the appended claims are intended to cover all such modifications and changes as fall within the true spirit and scope of the invention.

What is claimed is:

1. A weight measuring arrangement for a cooking appliance having a cooktop with an opening formed therein for receiving a surface heating unit of the type adapted to carry loads placed thereon for heating, said arrangement comprising:

at least one surface heating unit received in an opening in the cooktop;

support means for supporting said surface unit in the opening in the cooktop, said support means comprising three cantilever arms mounted adjacent the opening and extending beneath said surface unit, said heating unit being supported from the free end of each of said arms at three support points, said support points being arranged such that said weight is equally distributed among said three points;

transducer means responsive to the flexing of said cantilever arms and operative to generate an output signal representative of the weight of the load carried on said heating unit; said transducer means comprising strain gage means for measuring the strain exhibited by each of said arms when flexed by said weight; said three arms being constructed and arranged such that strain sensed for two of said arms subjected to said weight is substantially identical and the strain sensed for the third one of said arms is one half-that of said two arms;

said strain gage means comprising two sets of two strain gages, each gage in one set of gages being positioned to sense the strain of a corresponding one of said two arms and both gages in the remaining set of gages being arranged to sense the strain of said third arm.

2. A weight measuring unit according to claim 1 wherein each of sai strain gages comprises a resistive element characterized by an electrical resistance value which increases under tension and decreases under compression; and wherein one of said sets of gages is positioned to respond to tension, and the other of said sets of gages is positioned to respond to compression as said cantilever arms flex under said weight.

3. The weight measuring arrangement of claim 2 wherein said strain gages are electrically connected in a bridge network with one gage in each branch of said bridge, said gages in each of said sets being connected in opposite branches of said bridge such that the output signal from said bridge is proportional to the sum of the strain sensed by each of said gages, which sum is proportional to said weight.

4. The weight measuring arrangement of claim 3 wherein each of said strain gages is subjected to a common thermal environment to provide thermal compensation for the output signal from said bridge.

5. The weight measuring arrangement of claim 4 further comprising display means responsive to the output signal from said bridge operative to visually display said weight of the load carried on said heating unit.

6. A weight measuring assembly for an electric cooking appliance comprising:
a surface unit adapted for support at three support points, the combined weight of said unit and the load placed thereon to be heated being equally distributed among said three support points;
means for supporting said surface unit comprising:
a support surface having an opening therein for receiving said surface unit;
a three arm cantilever beam member supported from said support surface adjacent said opening; each of said arms extending beneath said surface unit to support said surface unit at corresponding ones of said support points such that each arm supports one-third of said combined weight; two of said arms being constructed and arranged to exhibit equal strain and the third arm being constructed and arranged to exhibit one-half of the strain of said two arms when said arms are equally deflected by said combined weight supported therefrom;
four substantially identical strain gages for measuring the strain of said beam members, each characterized by an electrical resistance value which increases under tension and decreases under compression;
each of said two arms carrying one of said strain gages on one surface thereof;
said third arm carrying two of said strain gages on the opposite surface thereof such that two of said gages are subjected to tension and the other two of said gages are subjected to compression by deflection of said arms;
said strain gages being electrically connected in a resistance bridge network with one gage in each branch of said bridge, said gages carried on the same surface of said arms being in opposite branches of said bridge whereby the output signal from said bridge represents the sum of the strain sensed by each of said gages, which sum is proportional to said combined weight supported by said arms.

7. A weight measurement and display arrangement for a cooking appliance of the type having a cooktop with an opening formed therein for receiving a surface heating unit, said arrangement comprising:
a surface heating unit received in an opening in the cooktop;
support means extending beneath said surface heating unit to support said surface unit in the opening in the cooktop, said support means being constructed and arranged to flex in proportion to the combined weight of the heating unit and the load carried thereon;
transducer means responsive to the flexing of said support means and operative to generate an electrical gross weight signal representing the weight carried on said surface unit;
display means;
circuit means operative to couple the gross weight signal from said transducer means to said display means enabling said display means to display weight information relating to the load carried on said heating unit;
user operable tare switch means;
tare circuit means responsive to said tare switch means and operative when said tare switch is actuated to generate a tare weight signal which effectively equals said gross weight signal, and further operative to hold said tare weight signal when said tare switch is thereafter deactuated;
means for comparing said gross weight signal and said tare weight signal and generating a net weight signal representing the difference between said gross weight signal and said tare weight signal; and
means for coupling said net weight signal to said display means enabling said display means to display the weight represented by said net weight signal, whereby following actuation and deactuation of said tare switch said display means displays weight information representing the difference between said gross weight signal and said tare weight signal.

8. The weight measuring arrangement of claim 7 wherein said support means comprises a plurality of cantilever arms supported from the cooktop adjacent the opening and extending beneath said surface unit, said heating unit being supported from the free end of each of said arms; and wherein said transducer means comprises a plurality of strain gages with at least one of said strain gages secured to each of said arms for measuring the strain exhibited by each of said arms when flexed by said weight.

9. The weight measuring arrangement of claim 8 wherein said plurality of cantilever arms comprises three arms supporting said heating unit at three support points, said support points being arranged such that said weight is equally distributed among said three points; said three arms being constructed and arranged such that strain sensed for two of said arms subjected to said weight is substantially identical and the strain sensed for the third one of said arms is one-half that of said two arms; and
wherein said plurality of gages comprises two sets of two gages, each gage in one set of gages being positioned to sense the strain of a corresponding one of said two arms and both gages in the remaining set of gages being arranged to sense the strain of said third arm.

10. A weight measuring unit according to claim 9 wherein each of said strain gages comprises a resistive element characterized by an electrical resistance value which increases under tension and decreases under compression; and wherein one of said sets of gages is positioned to respond to tension, and the other of said sets of gages is positioned to respond to compression as said cantilever arms flex under said weight.

11. The weight measuring arrangement of claim 10 wherein said strain gages are electrically connected in a bridge network with one gage in each branch of said bridge, said gages in each of said sets being connected in opposite branches of said bridge such that the output signal from said bridge is proportional to the sum of the strain sensed by each of said gages, which sum is proportional to said weight.

* * * * *

UNITED STATES PATENT AND TRADEMARK OFFICE
CERTIFICATE OF CORRECTION

PATENT NO. : 4,476,946

DATED : October 16, 1984

INVENTOR(S) : Peter H. Smith

It is certified that error appears in the above-identified patent and that said Letters Patent is hereby corrected as shown below:

Column 15, Line 2, "sai" should read --said--

Signed and Sealed this

Sixteenth Day of April 1985

[SEAL]

Attest:

DONALD J. QUIGG

Attesting Officer     Acting Commissioner of Patents and Trademarks